United States Patent
Lundquist et al.

(10) Patent No.: US 12,013,521 B2
(45) Date of Patent: Jun. 18, 2024

(54) SYSTEMS AND METHODS FOR OPTICAL SCANNING AND IMAGING THROUGH A FLUID MEDIUM FOR NUCLEIC ACID SEQUENCING

(71) Applicant: MGI Tech Co., Ltd., Shenzhen (CN)

(72) Inventors: Paul Lundquist, Oakland, CA (US); Jay Shafto, Mountain View, CA (US); Joyce Huang, Redwood City, CA (US); Ziyi Wu, Sunnyvale, CA (US)

(73) Assignee: MGI Tech Co., Ltd., Shenzhen (CN)

( * ) Notice: Subject to any disclaimer, the term of this patent is extended or adjusted under 35 U.S.C. 154(b) by 198 days.

(21) Appl. No.: 17/353,901

(22) Filed: Jun. 22, 2021

(65) Prior Publication Data
US 2021/0405337 A1 Dec. 30, 2021

Related U.S. Application Data

(60) Provisional application No. 63/045,566, filed on Jun. 29, 2020.

(51) Int. Cl.
*C12Q 1/6869* (2018.01)
*G02B 21/00* (2006.01)
(Continued)

(52) U.S. Cl.
CPC ....... *G02B 21/008* (2013.01); *G02B 21/0036* (2013.01); *G02B 21/02* (2013.01); *G02B 21/24* (2013.01); *G02B 21/33* (2013.01)

(58) Field of Classification Search
CPC .. G02B 21/008; G02B 21/0036; G02B 21/02; G02B 21/24; G02B 21/33; G01N 21/6452; C12Q 1/6869
See application file for complete search history.

(56) References Cited

U.S. PATENT DOCUMENTS 6,547,721 B1 * 4/2003 Higuma ............ G02B 23/2492
600/110
6,582,903 B1 6/2003 Rigler et al.
(Continued)

FOREIGN PATENT DOCUMENTS

| CA | 2974241 A1 * | 3/2010 | ............... C12Q 1/68 |
| CN | 1192745 | 9/1998 | |
| CN | 108474022 | 8/2018 | |

OTHER PUBLICATIONS

International Application No. PCT/CN2021/101994, International Search Report and Written Opinion mailed on Sep. 24, 2021, 11 pages.

*Primary Examiner* — Philip P. Dang
(74) *Attorney, Agent, or Firm* — Kilpatrick Townsend & Stockton LLP

(57) ABSTRACT

Embodiments of the disclosure include methods and systems for nucleic acid sequencing that may include an objective coupled to an actuator, wherein the actuator is configured to move the objective over a surface of a substrate. In some embodiments, a droplet may be disposed on the surface of the substrate, and the droplet may be moved along with the objective. The distal end of the objective may include a material that provides a higher friction against the droplet than a material of the surface of the substrate. In some embodiments, the distal end of the objective may be immersed in a fluid as it is moved over the surface of the substrate. The substrate may include vertical walls within a region to retain the fluid.

21 Claims, 10 Drawing Sheets

(51) Int. Cl.
*G02B 21/02* (2006.01)
*G02B 21/24* (2006.01)
*G02B 21/33* (2006.01)

(56) References Cited

U.S. PATENT DOCUMENTS

| | | | | |
|---|---|---|---|---|
| 8,142,351 | B2* | 3/2012 | Aono | A61B 1/128 |
| | | | | 600/168 |
| 9,516,998 | B2* | 12/2016 | Iwasaki | A61B 1/0058 |
| 9,624,540 | B2* | 4/2017 | Lundquist | G01N 21/6428 |
| 9,967,486 | B2* | 5/2018 | Yoshida | A61B 1/00163 |
| 10,244,932 | B2* | 4/2019 | Fujii | A61B 1/00188 |
| 10,365,434 | B2* | 7/2019 | Wang | G02B 6/124 |
| 10,512,911 | B1 | 12/2019 | Beckett et al. | |
| 11,450,544 | B2* | 9/2022 | Kobata | B24B 37/04 |
| 2003/0157538 | A1* | 8/2003 | Krull | C12Q 1/6825 |
| | | | | 435/6.12 |
| 2005/0227358 | A1 | 10/2005 | McEntee et al. | |
| 2008/0163278 | A1* | 7/2008 | Wakabayashi | G11B 7/0932 |
| 2013/0016328 | A1 | 1/2013 | Daugharthy et al. | |
| 2013/0065795 | A1* | 3/2013 | Allbritton | C12N 1/02 |
| | | | | 506/40 |
| 2020/0243364 | A1* | 7/2020 | Kobata | H01L 21/32134 |

* cited by examiner

600

> Dispose a droplet on an exterior surface of a substrate, wherein the substrate comprises one or more nucleotide sequences, and wherein the exterior surface of the substrate comprises a first material — 610

> Position an objective lens at a first location over the exterior surface of the substrate such that a distal end of the objective lens is in contact with the droplet, wherein the distal end of the objective lens comprises a second material, the second material being configured to provide a higher friction against the droplet than the first material — 620

> Move the objective lens to a second location over the exterior surface of the substrate, wherein the moving of the objective lens is configured to move the droplet with the distal end of the objective lens such that the objective lens and the exterior surface of the substrate maintain contact with the droplet at the second location. — 630

*FIG. 6*

SYSTEMS AND METHODS FOR OPTICAL SCANNING AND IMAGING THROUGH A FLUID MEDIUM FOR NUCLEIC ACID SEQUENCING

CROSS-REFERENCE TO RELATED APPLICATIONS

This application claims the benefit of U.S. Provisional Application No. 63/045,566, filed Jun. 29, 2020 for "Systems and Methods for Optical Scanning and Imaging Through a Fluid Medium for Nucleic Acid Sequencing," the entire contents of which are herein incorporated by this reference.

RELATED FIELDS

The present invention is generally related to imaging systems, and in particular to imaging systems for use in nucleic acid sequencing and biochemical experiments generally.

BACKGROUND

Obtaining useful data from images of biochemical experiments requires high spatial resolution, accuracy, and speed. Such images typically need to be obtained at high enough magnification for individual samples to be clearly resolved. At the same time, the images need to cover a large enough field of view for samples to be correctly identified. For large-scale studies, the imaging and image processing must take place quickly enough in order to be commercially feasible.

Step-and-repeat imagers and time-delay integration (TDI) imagers are two broad types of imaging systems that can be used to image biochemical experiments. Step-and-repeat systems can acquire about 10 megapixels of image data per second with about 5 μm alignment accuracy. TDI systems can acquire about 30 megapixels of image data per second with about 50 nm alignment accuracy. While for some applications these two types of systems may perform reasonably well, for other applications they suffer from some structural and functional disadvantages that adversely affect overall throughput. For example, applications involving large-scale biochemical experiment studies (e.g., such as massively parallel whole genome sequencing) typically require overall throughput that is higher than what step-and-repeat and TDI imaging systems can currently deliver.

BRIEF SUMMARY

This disclosure presents systems and methods for imaging biochemical reactions. The systems and methods may be employed in, for example, sequencing template nucleic acid molecules disposed on a substrate. The substrate may include an array of spots including biochemical molecules. The disclosure relates to an optical imaging system that may be configured to image the substrate by rapidly scanning an objective over a substrate. The disclosed optical imaging system provides improved resolution over conventional systems, thereby allowing for increased density of spots on the substrate and thereby creating significant cost savings as will be discussed herein.

In some embodiments, an optical imaging system may include an actuator; a mounting element configured to receive a substrate, wherein the substrate includes one or more nucleic acid sequences, wherein an exterior surface of the substrate is configured to receive a droplet, the exterior surface of the substrate including a first material; and an objective including a proximal end and a distal end, wherein the proximal end of the objective is coupled to the actuator and the distal end of the objective is configured to be near the exterior surface of the substrate, the distal end of the objective including a second material, wherein the second material is configured to provide a higher friction against the droplet than the first material; wherein the actuator is configured to move the objective from a first location over the exterior surface of the substrate to a second location over the exterior surface of the substrate, and wherein moving the objective is configured to move the droplet with the distal end of the objective such that the objective and the exterior surface of the substrate maintain contact with the droplet at the second location.

In some embodiments, a method for optically imaging a substrate for sequencing a nucleic acid sequence may include disposing a droplet on an exterior surface of the substrate, wherein the substrate includes one or more nucleic acid sequences, and wherein the exterior surface of the substrate includes a first material; positioning an objective at a first location over the exterior surface of the substrate such that a distal end of the objective is in contact with the droplet, wherein the distal end of the objective includes a second material, the second material being configured to provide a higher friction against the droplet than the first material; and moving the objective to a second location over the exterior surface of the substrate, wherein the moving of the objective is configured to move the droplet with the distal end of the objective such that the objective and the exterior surface of the substrate maintain contact with the droplet at the second location.

In some embodiments, an optical imaging system may include an actuator; a mounting element configured to receive a substrate, wherein the substrate includes vertical walls bounding a region of the substrate, the vertical walls being configured to retain a fluid within the region, and wherein the substrate includes one or more nucleic acid sequences; and an objective including a proximal end and a distal end, wherein the proximal end of the objective is coupled to the actuator and the distal end of the objective is configured to be near an exterior surface of the substrate, wherein the distal end of the objective is configured to be immersed in the fluid; wherein the actuator is configured to move the objective from a first location over the exterior surface of the substrate to a second location over the exterior surface of the substrate while the distal end of the objective remains immersed in the fluid.

In some embodiments, a method for optically imaging a substrate for sequencing a nucleic acid sequence may include disposing a fluid within a region of a substrate, wherein the region is bounded by vertical walls, and wherein the substrate includes one or more nucleic acid sequences; positioning an objective at a first location over the exterior surface of the substrate such that a distal end of the objective is in contact with the droplet; and moving the objective to a second location over the exterior surface of the substrate while the distal end of the objective remains immersed in the fluid.

This summary is provided to introduce the different embodiments of the present disclosure in a simplified form that are further described in detail below. This summary is not intended to be used to limit the scope of the claimed subject matter. Other features, details, utilities, and advantages of the claimed subject matter will be apparent from the following detailed description.

BRIEF DESCRIPTION OF THE DRAWINGS

FIG. 6 illustrates an example method for optically imaging a substrate for sequencing a nucleic acid sequence on the substrate.

Figure 1A:
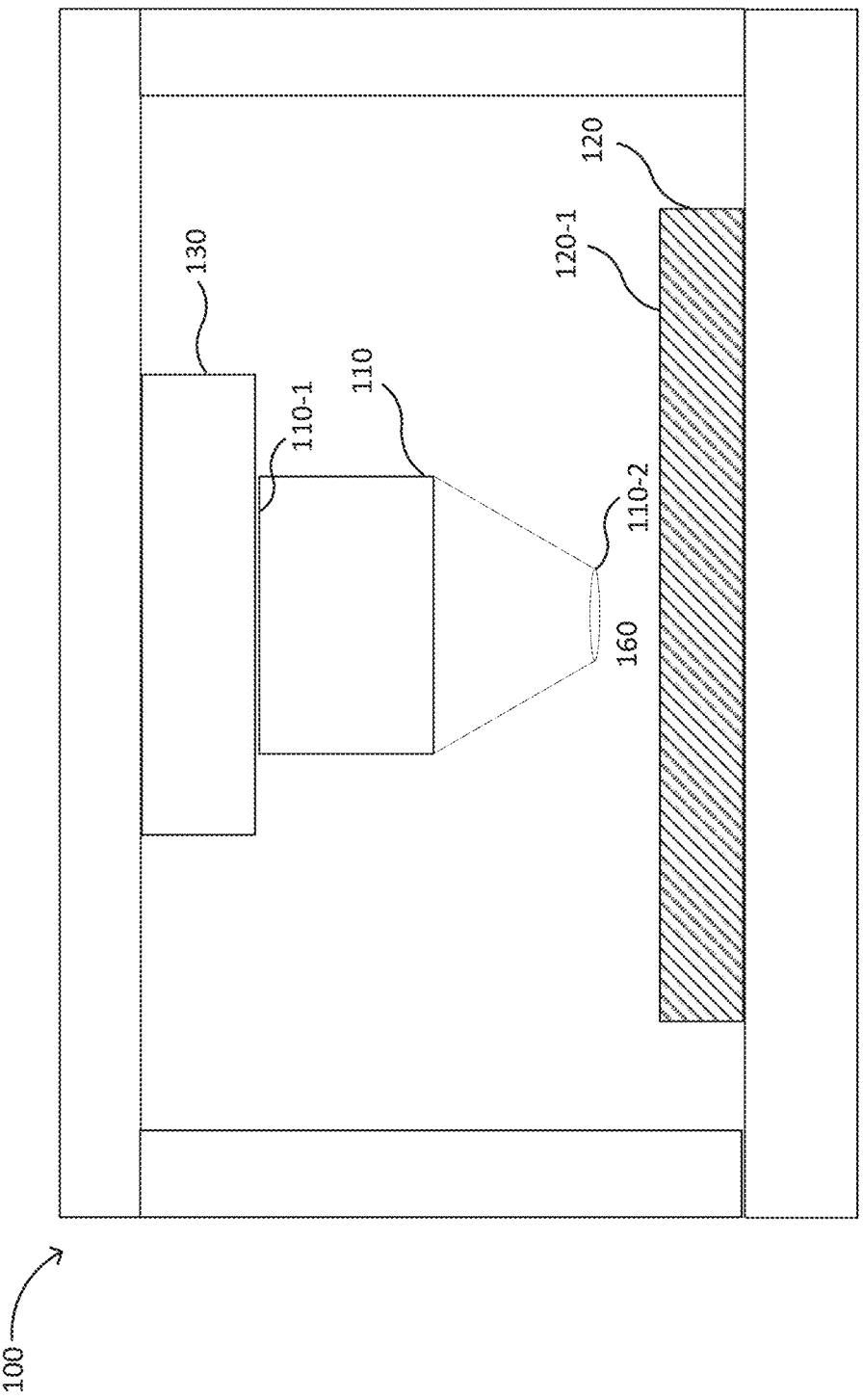
FIGS. 1A-1B illustrates a schematic of an optical imaging system.

In accordance with common practice, the described features and elements are not drawn to scale but are drawn to emphasize features and elements relevant to the present disclosure.

DETAILED DESCRIPTION

The present disclosure describes an optical imaging system that may be employed in imaging biochemical reactions. For example, the disclosed optical imaging system may be employed in sequencing template nucleic acid molecules (e.g., DNA molecules, RNA molecules). In some embodiments, the template nucleic acid molecules may be bound to, or otherwise disposed on, a surface of a substrate (e.g., an interior surface of a flowcell) that may be imaged by the optical imaging system. For example, DNA templates may be immobilized at greater than 10e7 positions (spots) on an array in a planar interior surface of a substrate (e.g., a flowcell). In this example, a nucleic acid sequencing method may involve carrying out greater than 400 sequencing cycles. In each cycle, single nucleotides (e.g., adenine, guanine, thymine, and cytosine) may be flowed across the substrate and incorporated (into a growing strand) at each site where there is a complementary nucleotide base. In one approach, each of the four different nucleotides may be labeled with a different color fluorescent dye or bound by a dye-labeled antibody. In each sequencing cycle, a light source (e.g., a laser) may illuminate the spots (e.g., in series), causing the dye to emit light corresponding to the respective colors. The color emitted at each spot from one of the four dyes may be detected by a camera (e.g., a time delay integration charge-coupled device (TDI-CCD) camera or a similar camera), and the imaging system may thereby record, for each spot, the detection of a nucleotide corresponding to the detected color. Persons knowledgeable in the art will be aware of variations in sequencing methods including variations in template type (see, e.g., Huang et al., 2017, Gigascience 6:1-9; Mardis et al., 2013, Annu Rev Anal Chem 6:287-303), labeling systems (see, e.g., WO2018129214) and labeling strategies (see, e.g., U.S. Pat. No. 9,523,125). In conventional systems, the emitted light may travel from the spot on the substrate, through a glass coverslip (e.g., the top of the substrate), through an air gap, into a microscope objective, and to the camera, which captures one or more images. In some embodiments, the objective may include a housing and one or more lenses disposed within the housing configured to gather and focus light rays from the substrate and focuses the light rays to produce a magnified image that can be captured by the camera. The system may be configured such that the objective is moved in a pattern over the array of spots on the substrate so that the entire array is imaged during each cycle. Although the disclosure focuses on sequencing nucleic acid molecules, the disclosure contemplates using the disclosed optical imaging system to image any suitable biochemical experiments.

The majority, or at least a large portion, of the costs associated with nucleic acid sequencing per gigabase is the quantity of reagents consumed in the sequencing process. For this reason, increasing the density of samples on a substrate significantly reduces the cost of nucleic acid sequencing. In any system based on optical detection, the optical Numerical Aperture (NA) of the detection system may determine in part the optical resolution of the system, which may thus determine the maximum density of samples. Optical systems with a high NA tend to be more expensive, larger, and more difficult to align and maintain than optical systems with a low NA.

In particular optical systems (e.g., a confocal optical system), the NA may be limited by the lowest refractive index in the image chain. The reason for the NA limit is the critical angle at each interface between materials. The critical angle defines the maximum ray angle that will not be totally reflected at the interface. When the refractive indices at each interface in the image chain are similar, the critical angle is large. As the difference in refractive indices increases, this critical angle gets smaller, thereby reducing the amount of light that is transmitted through the interface. The objective of an optical system has a relatively high refractive index, and a segment of the image chain with a relatively low refractive index may create a relatively small critical angle, thus reducing the amount of light that is transmitted to the objective. Thus, one way of increasing the NA of such a system without resorting to the more expensive, larger, more complex equipment of high-NA systems may be to raise the refractive index of one or more segments of the image chain that tend to have lower refractive indices. Methods and systems for doing so are disclosed herein.

In conventional optical systems used for nucleic acid sequencing, the segment of the image chain with the lowest refractive index is often an air gap that may be present, for example, between an objective of the optical system and the substrate. The air gap generally has index of refraction of about 1.00. In this example, the NA of an example optical imaging system may be approximately 0.8. Replacing the air with a substance having a higher refractive index may increase the overall NA of the optical system. For example, the air gap may be replaced with water, which may raise the lowest refractive index of the image chain to 1.33. In this example, the NA of a similar optical imaging system with water instead of the air gap may be approximately 1.0. As another example, the air gap may be replaced with standard oil, which may raise the lowest refractive index of the image chain to 1.51. In this example, the NA of a similar optical imaging system with water instead of the air gap may be approximately 1.2. As another example, the air gap may be replaced with high-index oil, which may increase the NA further to 1.4. As another example, any suitable water-based or oil-based solution may be used to appropriately cause a desired change to the lowest refractive index. Essentially, the disclosure proposes using a fluid with a refractive index higher than air as a medium in between the objective and the substrate. Raising the lowest refractive index of the image chain has a direct and measurable effect on the NA of the optical imaging system, which allows for increased resolution and therefore increased density of spots on a substrate. This increased density translates to lowered costs, due to a decreased requirement for reagents. This can be illustrated by setting an optical imaging system with an air gap as a benchmark, such that density of such a system is set to a value of 1.00 and relative cost is set to 1.00. With this benchmark in mind, replacing the air gap with water may increase the density to about 1.56 and may correspondingly decrease the relative cost to about 0.64; replacing the air gap with standard oil may increase the density to about 2.25 and may correspondingly decrease the relative cost to about 0.44; and replacing the air gap with high-index oil may increase the density to about 3.06 and may correspondingly decrease the relative cost to about 0.33.

Although the use of fluid mediums with refractive indices higher than air is well known in standard microscopy applications using immersion objective optical systems, such applications involve a static imaging process. In dynamic imaging processes, such as the scanning optical system contemplated herein for imaging a substrate as an objective rapidly moves over the substrate, conventional immersion objective optical systems are unsatisfactory. Example optical scanning systems may move the objective at speeds between 10 mm/s and 60 mm/s. In some cases, next-generation sequencing systems may be equipped to move the objective at speeds of around 300 mm/s. Moving an objective of a conventional system within such a fluid medium at such rapid speeds would tend to cause excessive turbulence (and generation of bubbles) that could affect the image quality as well as cause loss of the fluid medium. This disclosure describes two approaches for a solution that replaces the air gap with a fluid medium of a higher refractive index, while addressing the potential issues that would ordinarily present themselves when the objective is moved rapidly. In some embodiments, the approaches disclosed here may be used to allow the objective to move between speeds of 10 mm/s and 60 mm/s, or 10 mm/s and 300 mm/s, while maintaining good image quality using the fluid medium. In some embodiments, very high speeds may be achieved, allowing for speeds between 10 mm/s and 3750 mm/s, or 30 mm/s and 3750 mm/s. This may allow for a camera line rate of, for example, about 1M/s for fast scanning and imaging.

FIG. 1A illustrates an example schematic of an optical imaging system 100. For example, referencing FIG. 1, the optical imaging system 100 includes the objective 110, which may be configured for use in capturing images of the substrate 120. Referencing FIG. 1, the objective 110 may include a proximal end 110-1 and a distal end 110-2. The proximal end 110-1 of the objective 110 may be coupled (directly or indirectly) to the actuator and the distal end 110-2 of the objective 110 may be configured to be near the exterior surface 120-1 of the substrate 120. In some embodiments, biochemical molecules may be bound to, or otherwise disposed on, an interior of the substrate (e.g., an interior surface of the substrate). For example, an interior surface of a substrate may include one or more target nucleic acid sequences. In some embodiments, the exterior surface of the substrate may be a surface of a separate element that may be removably positioned over the remainder of the substrate. For example, referencing FIG. 1, the exterior surface 120-1 of the substrate 120 may be a surface of a coverslip that is positioned over the remainder (e.g., referencing FIG. 1, the bottom portion of the substrate, which may be the portion that is other than the top wall) of the substrate (e.g., a flowcell that is otherwise uncovered on the top). In this example, biochemical molecules such as polynucleotides may be disposed on interior surfaces of the bottom portion of the substrate, and an element such as a coverslip may be positioned over the bottom portion of the substrate. In other embodiments, the substrate may be more integrated structure, with the exterior surface being integrated into the substrate. For example, referencing FIG. 1, the exterior surface 120-1 may be an integrated, non-removable part of the substrate 120. In this example, there may one or more chambers and/or conduits within the substrate 120, and biochemical molecules such as nucleic acid sequences may be disposed on interior surfaces of the chambers and/or conduits.

In some embodiments, the optical imaging system 100 may include an actuator for moving (or "scanning") the objective across a plurality of locations over the exterior surface 120-1 of the substrate 120. For example, referencing FIG. 1, the objective 110 is coupled to the actuator 130. Although the actuator is illustrated in FIG. 1 as a single block, it is to be understood that the actuator may be a multicomponent subsystem capable of moving the objective over the exterior surface 120-1 of the substrate 120.

Figure 1B:
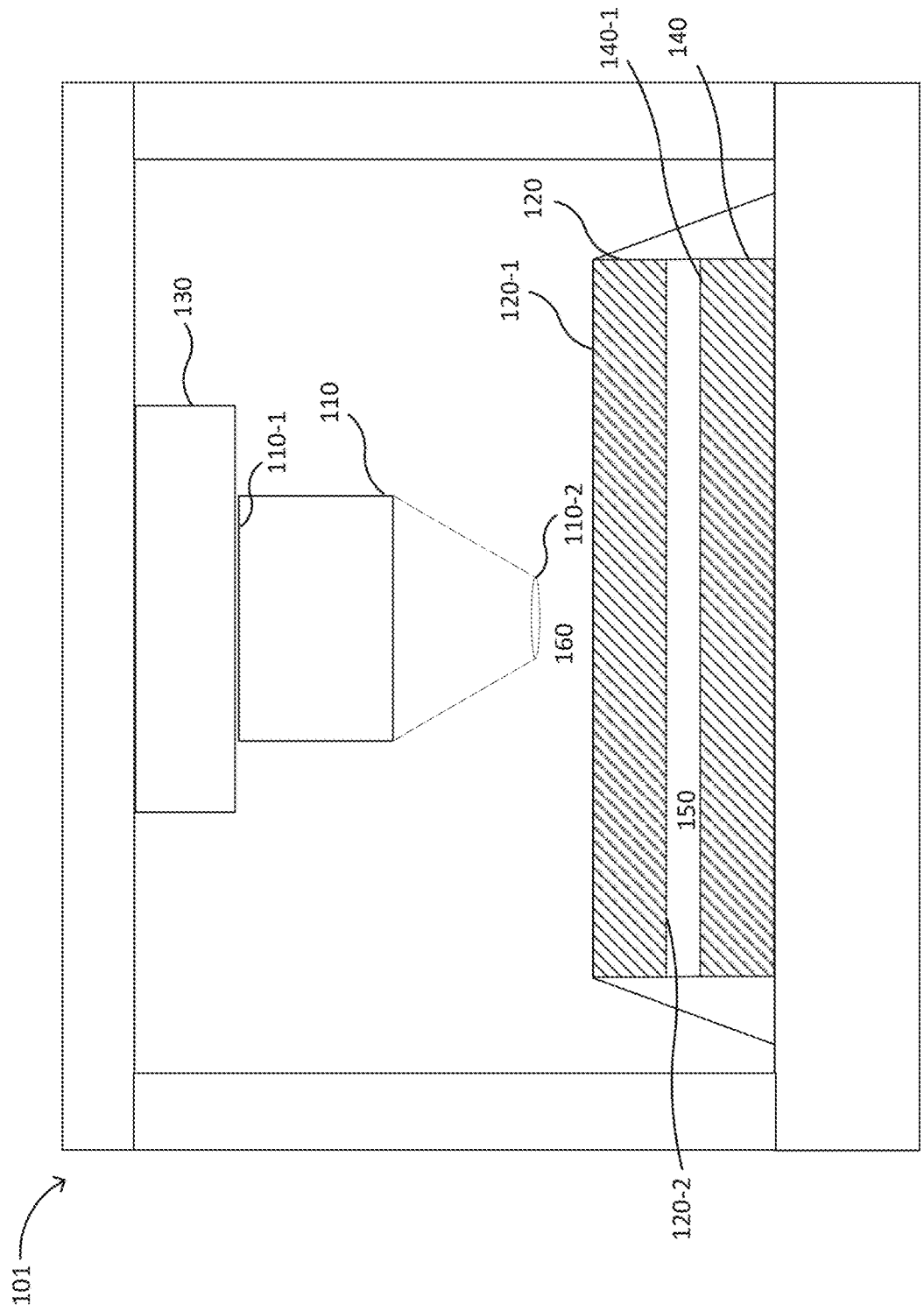

FIG. 1B illustrates another example schematic of an optical imaging system 101. In some embodiments, an optical imaging system may include an objective configured for use in capturing one or more images of substrate (e.g., a flowcell). An embodiment of a flowcell is schematically shown in FIG. 1. As illustrated, the flow cell comprises first substrate 120, second substrate 140, and flow space 150. In one approach nucleic acid template molecules (e.g., DNBs) are immobilized at positions on an inner surface of a substrate (e.g., surface 120-2 or 140-1), and reagents and wash buffers are flowed through space 150. Thus, space 150 is generally an aqueous environment, which may be necessary to preserve the nucleic acid templates disposed therein. The positions, or spots, may be organized as a regular, ordered array on surface 120-2 or 140-1 and are adapted to contain nucleic acid template molecules. For example, the positions may be regions of the substrate surface derivatized to bind nucleic acid molecules (e.g., DNBs, a template cluster produced by bridge amplification, or other templates), wells, or other structures. In the process of sequencing or other analysis a detectable light signal, e.g., a fluorescent or luminescent signal, is emitted by dyes associated with the template molecules. For example, in sequencing-by-synthesis methods the dyes may be linked to nucleotides incorporated into growing strands at each position, or, alternatively, may be bound to associated with affinity reagents bound to incorporated nucleotides. The emitted signal (hereinafter referred to as a "fluorescent" signal) travels from the templates immobilized on surface 140-1 or 120-2 though substrate (e.g., glass coverslip) 120, and through gap 160, to the distal end 110-2 of the objective. In this approach substrate 120 is transparent to the light signal, but substrate 140 may be opaque. As discussed elsewhere herein, gap 160 may contain water or oil. In one approach nucleic acid templates are immobilized on surface 120-2 of substrate 120. In one approach, the nucleic acid templates are positioned on a patterned array on surface 120-2. In such approaches (e.g., where the nucleic acid templates are positioned on the surface 120-2), the fluorescent signal would not need to travel through the aqueous environment of space 150. This may be advantageous especially in cases where the gap 160 contains oil or another material with a relatively high index of refraction, because, as explained below, image quality and resolution are limited in part by the lowest-refractive-index medium through which light rays travel. Thus, eliminating the aqueous medium from the pathway of the light rays (by disposing nucleic acid templates on the surface 120-2) serves to increase image quality and resolution by eliminating the relatively low-refractive-index aqueous medium within the space 150. For example, when the nucleic acid templates are positioned on the surface 120-2, light rays from the nucleic acid templates would only need to travel through the substrate 120, the oil or other high-refractive-index material, and the objective, before being imaged. That is, there light rays do not have to travel through the aqueous medium that may need to be in the space 150. In some embodiments, the nucleic acid templates may be disposed on the surface 140-1. For avoidance of doubt, nothing in the description of a particular flow cell is intended to limit the present invention.

Figure 2:
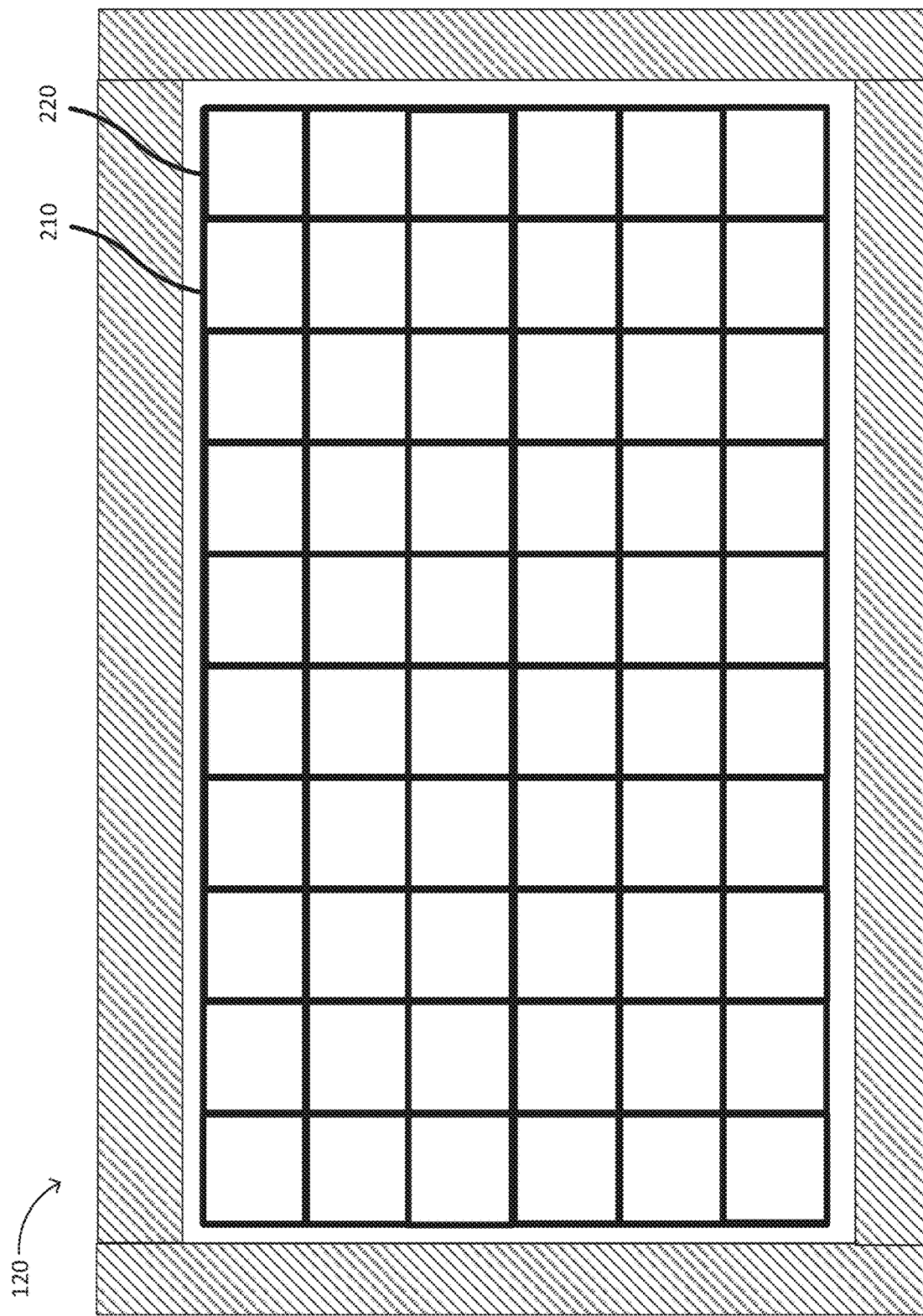
FIG. 2 illustrates the substrate shown in FIG. 1, divided into an array of subregions.

FIG. 2 illustrates the substrate 120 shown in FIG. 1, divided into an array of subregions. In some embodiments, the substrate may be divided up into a plurality of subregions. For example, referencing FIG. 2, the substrate 120 may include a plurality of subregions such as the first subregion 210 and the second subregion 220. In one approach the substrate has a patterned array of derivatized areas ("spots") at which DNA templates (e.g., DNBs are immobilized). In some embodiments, there may be physical barriers between the subregions. In other embodiments, the subregions may not be separated by physical barriers. That is, the divisions between the regions may be imaginary divisions not bounded by any structural elements. Each of the subregions may correspond to spots, each of the spots may include a particular subset of molecules (e.g., a particular set of DNA template strands). In some embodiments, the actuator may be configured to move the objective among the different subregions of the substrate. For example, referencing FIG. 2, the actuator may be configured to move the objective from a first location over the exterior surface 120-1 of the substrate 120 (e.g., corresponding to the subregion 210) to a second location over the exterior surface 120-1 of the substrate 120 (e.g., corresponding to the subregion 220). Although FIG. 2 illustrates the substrate 120 divided up into discrete subregions (e.g., the first subregion 210 and the second subregion 220), the disclosure contemplates that the substrate may not be divided up into discrete subregions at all, and that the actuator may simply move continuously from one location to another over the exterior surface 120-1 of the substrate 120 while imaging the substrate 120.

Figure 3A:
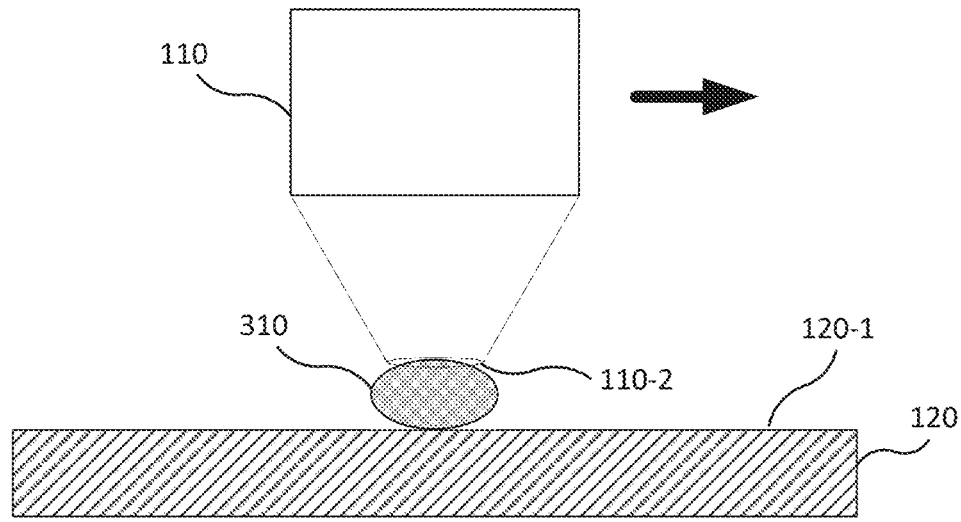
FIGS. 3A-3B illustrate an example embodiment of the optical imaging system that disposes and maintains a droplet between the objective and the substrate.
Figure 3B:
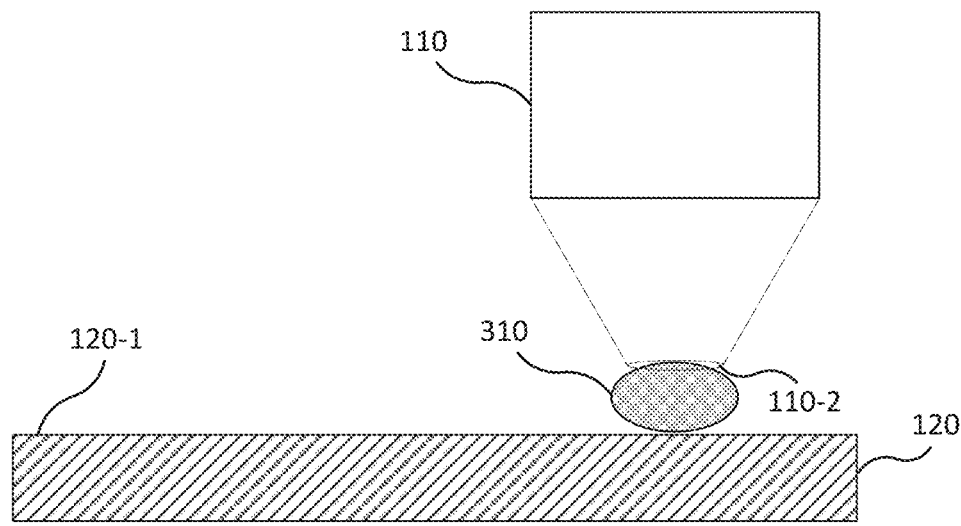

FIGS. 3A-3B illustrate an example embodiment of the optical imaging system 100 that disposes and maintains a droplet 310 between the objective 110 and the substrate 120. In some embodiments, the optical imaging system 100 may replace the air gap that is traditionally present in optical scanning systems with a droplet of a fluid that has a refractive index greater than that of air. For example, referencing FIG. 3A, the optical system 100 may dispose the droplet 310 such that it contacts both the distal end 110-2 of the objective 110 and the exterior surface 120-1 of the substrate 120, so that the fluid of the droplet acts as a medium through which light rays can travel between the objective 110 and the substrate 120 without an air gap. In some embodiments, the droplet may be a droplet of water, a droplet of oil, a droplet of a water-based solution, or a droplet of an oil-based solution.

In some embodiments, the droplet 310 may be disposed by a droplet delivery subsystem, which may include, for example, a conduit (e.g., a pipe or other suitable channel) coupled to a fluid reservoir. The droplet delivery subsystem may include any suitable microfluidic droplet generator configured to generate droplets from the fluid in the fluid reservoir. The droplet generator may be configured to generate the droplets at any suitable predetermined size. The droplets may be conducted via the conduit and positioned at an appropriate location on the exterior surface 120-1 of the substrate 120 using any suitable means, such as electrowetting on dielectric (EWOD) or pressure differentials.

FIGS. 3A-3B illustrate how the objective 110 may be moved from a first location (FIG. 3A) to a second location (FIG. 3B) over the substrate 120, as it takes one or more images of the substrate 120. As discussed above, this movement may occur rapidly (e.g., 15 mm/s, 300 mm/s). Despite this rapid movement, the optical imaging system 100 is able to retain the droplet 310 in position underneath the distal end 110-2 of the objective 110 (in its entirety, or almost in its entirety with little loss of fluid) such that the droplet 310 remains between the distal end 110-2 of the objective 110 and the exterior surface 120-1 of the substrate 120. As the objective 110 is moved, both the distal end 110-2 and the exterior surface 120-1 of the substrate may maintain contact with the droplet during and at the end of the move. The optical imaging system 100 may be able to image the substrate 120 over multiple such moves all the while having the droplet 310 function as a fluid medium without the presence of an air gap in between the objective 110 and the substrate 120.

Although FIGS. 3A-3B illustrate the above concepts with respect to the single substrate design of the simplified schematic of FIG. 1A (e.g., where nucleic acid sequences that are imaged may be disposed on or within the substrate 120), it is to be noted that the disclosure contemplates that the same concepts apply for the schematic of FIG. 1B, where there are two substrates. For example, referencing FIG. 1B, the nucleic acid sequences that are imaged according to FIGS. 3A-3B may be disposed within the space 150 (e.g., bound to the surface 120-2 or 140-1).

In some embodiments, the optical imaging system 100 may be able to retain the droplet 310 as described above in part by engineering the surface chemistries of the distal end 110-2 of the objective 110 and/or the exterior surface 120-1 of the substrate 120. More specifically, the surface chemistry may be selected such that friction between a fluid medium and the distal end 110-2 of the objective 110 and/or the friction between the fluid medium and the exterior surface 120-1 of the substrate 120 may be optimized to increase droplet retention. For purposes of this disclosure, friction may be characterized as a force resisting the relative motion of the fluid medium sliding against the distal end 110-2 or the exterior surface 120-1. In some embodiments, the exterior surface 120-1 of the substrate may include a first material and the distal end 110-2 of the objective may include a second material, where the second material may be configured to provide a higher friction against the droplet than the first material. That is, the surface chemistries may be configured such that the droplet 310 experiences a relatively high friction at the distal end 110-2 of the objective, and a relatively low friction at the exterior surface 120-1 of the substrate 120. Such a configuration causes the portion of the droplet 310 that is in contact with the distal end 110-2 of the objective to be attracted thereto so as to urge the droplet along with the objective 110 as the objective 110 is moved. By contrast, the portion of the droplet 310 that is in contact with the exterior surface 120-1 of the substrate is not similarly attracted to the exterior surface 120-1 of the substrate, and the exterior surface 120-1 of the substrate may in fact repel the droplet 310 such that the droplet 310 may freely move across the exterior surface 120-1 without adhering thereto. Put another way, the surface chemistries may be selected such that the distal end 110-2 of the objective is configured to attract the droplet 310 and the exterior surface 120-1 of the substrate may repel the droplet 310. In some embodiments, the materials may be selected such that when a droplet of a particular fluid medium (e.g., an oil or water solution) is disposed on a surface, the droplet sits with a desired contact angle. For example, a droplet of the fluid medium disposed on the surface 120-1 may have a contact angle between 93 degrees and 160 degrees. A higher contact angle indicates a higher repulsion by the surface of the droplet, which may be desirable. As another example, the contact angle may be between 11 and 120 degrees. Similarly, the material of the distal end 110-2 of the objective 110 may be selected such that a droplet of the fluid medium sitting on a flat surface made of the material would have a contact angle between 20 and 80 degrees.

The degree of friction between various surfaces and fluids can be determined and compared by well-known means. Surfaces with different material compositions may have different degrees of friction with a particular fluid. Suitable materials may be selected to achieve the above-described attraction/repulsion effect based on relative friction to a particular fluid medium. In some embodiments, when the droplet 310 is, for example, water or water-based, the first material of the exterior surface 120-1 of the substrate may include a hydrophobic material (e.g., glass, silicon dioxide, sapphire, calcium oxide, Teflon, Polytetrafluoroethylene, Fluorinated ethylene propylene, Perfluoroalkoxy alkane), and the second material of the distal end 110-2 of the objective may include a hydrophilic material (e.g., Polyester, Polyurethane, Polyether, Sympatex). In some embodiments, when the droplet 310 is, for example, oil or oil-based, the first material of the exterior surface 120-1 of the substrate may include an oleophilic material (e.g. Barium sulfate, polyethylene terephthalate (PET), polypropylene, carbon-based sponges, functional polymer sponges, kapok/milkweed seed hair) and the second material of the distal end 110-2 of the objective may include an oleophobic material (e.g. Teflon and Teflon-derivatives, hexadecane, Polytetrafluoroethylene).

Figure 3C:
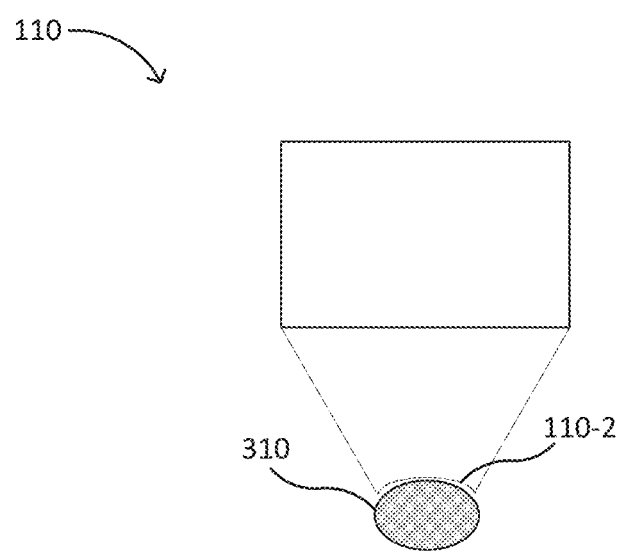
FIG. 3C illustrates a cross-section of an example embodiment of an objective with a concave distal end.

FIG. 3C illustrates a cross-section of an example embodiment of an objective 110 with a concave distal end 110-2. In some embodiments, the distal end 110-2 of the objective 110 may be concave so as to facilitate maintaining contact between the objective 110 and the droplet 310 as the objective 110 moves. In these embodiments, the curvature of the distal end 110-2 may provide increased attraction and may serve to assist with pulling a droplet along with the objective 110. The radius of curvature and the depth of the distal end 110-2 may be optimized based on the size of the droplet 310 that is generated by the droplet generator of the droplet delivery subsystem. For example, the distal end 110-2 may have a radius of curvature of between 45 mm and 160 mm, and a depth between 0.6 mm and 2.1 mm. These ranges have been found to be advantageous, for example, in helping retain a droplet as the objective moves. In some embodiments, the distal end 110-2 may be concave and may also have a surface chemistry as described above (e.g., with the distal end 110-2 including a material that provides increased friction and attraction toward the droplet), to enhance the ability of the distal end 110-2 to cause the droplet 310 to move along with the objective 110. In these embodiments, the concavity of the distal end 110-2 may also provide a level of synergy in achieving this goal, because the concave distal end 110-2 would have a larger surface area (which may provide friction and attraction to the droplet 310) in contact with the droplet 310 than if the distal end 110-2 were a flat surface.

Figure 4:
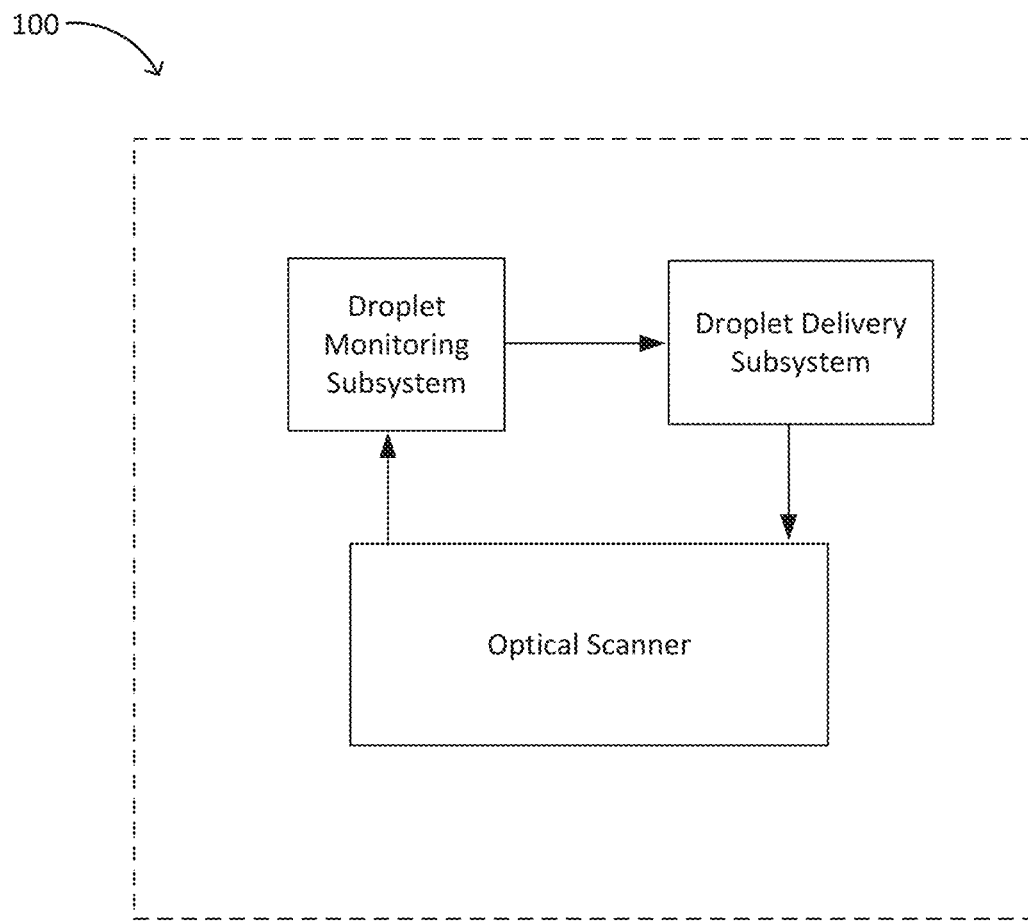
FIG. 4 illustrates an example schematic of an optical imaging system that includes a droplet monitoring subsystem and a droplet delivery subsystem.

FIG. 4 illustrates an example schematic of an optical imaging system 100 that includes a droplet monitoring subsystem and a droplet delivery subsystem. In some embodiments, as illustrated in FIG. 4, the optical imaging system 100 may include a droplet monitoring subsystem that (continuously or periodically) monitors to the optical scanner (which includes the hardware for imaging the substrate 120, such as the objective 110 and the actuator 130) for determining whether the objective 110 and the exterior surface 120-1 of the substrate 120 are in contact with the droplet 310. The droplet monitoring subsystem may use any suitable means to make this determination. For example, it may use a resistance or capacitance sensor to determine the presence of a droplet 310, an optical sensor to detect the presence of the droplet 310, or it may simply analyze the quality of the images captured via the objective 110 to ensure that the light rays are being refracted appropriately (thereby indicating that the droplet 310 is still present). If it is determined that the objective 110 and the exterior surface 120-1 of the substrate 120 are not both in contact with the droplet 310, the droplet delivery subsystem may be triggered to deliver an additional droplet to the optical scanner an appropriate location on the exterior surface 120-1 of the substrate 120 (e.g., under the objective 110). In this manner, the droplet monitoring subsystem and the droplet delivery subsystem, working in conjunction with the optical scanner, may create a feedback control loop that acts to maintain the droplet 310 over long periods of time and/or to correct for a system error that caused the droplet 310 to no longer be in position under the objective 110.

Figure 5A:
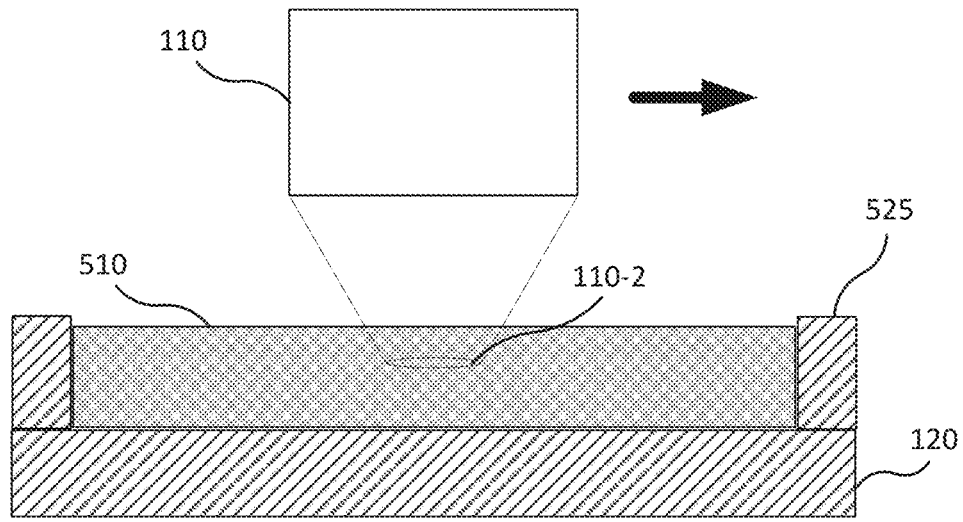
FIGS. 5A-5B illustrate an alternative embodiment of the optical imaging system that immerses a distal end of the objective into a fluid disposed over an exterior surface of the substrate.
Figure 5B:
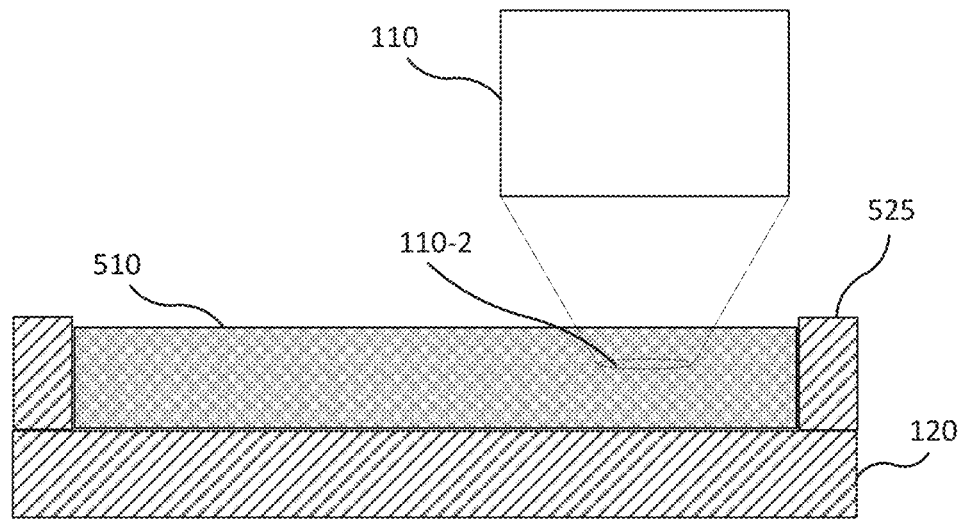

FIGS. 5A-5B illustrate an alternative embodiment of the optical imaging system 100 that immerses the distal end 110-2 of the objective into a fluid 510 disposed over the exterior surface 120-1 of the substrate 120. In some embodiments, referencing FIG. 5A, the substrate may include vertical walls 525 bounding a region of the substrate. The vertical walls 525 may be configured to retain a fluid 510 within the region. The fluid may be maintained at a level sufficient to immerse the distal end 110-2 of the objective 110 at a desired depth. The fluid may be any suitable fluid, including the fluids described above with respect to the droplet 310. In some embodiments, the vertical walls 525 may be part of the substrate (e.g., they may be molded to the substrate). In alternative embodiments, the vertical walls 525 may not be a part of the substrate and may instead be a part of a housing of the optical imaging system 100 that extends onto the substrate to produce the same or similar effect.

In these embodiments, when the actuator is moved from a first location (FIG. 5A) to a second location (FIG. 5B) over the substrate 120, the distal end 110-2 may remain immersed in the fluid. Thus, light rays are able to travel between the objective 110 and the substrate 120 through the fluid without an air gap. In some embodiments, the distal end 110-2 of the objective 110 may be flat so as to reduce turbulence as the objective is moved from the first location to the second location. As discussed above, high-throughput imaging applications may require rapid movements of the objective, which may amplify turbulence. Also as discussed above, turbulence may negatively affect image quality (e.g., by forming bubbles or flow aberrations that could create undesirable image artifacts) and/or cause the loss of the fluid 510 over time. Reducing this turbulence addresses these issues. Unlike embodiments of the optical imaging system 100 that use droplets, a concave distal end 110-2 may cause issues with embodiments where the objective is moved while immersed in the fluid. This is because the fluid 510 around an objective 110 having a concave distal end 110-2 would have a flow profile such that the fluid 510 in contact with the concave distal end 110-2 would flow at different speeds along different points of the curvature and would flow in a non-laminar fashion. This flow pattern would propagate across the entire region as the objective 110 moves, thereby creating excessive turbulence. By contrast, a flat distal end 110-2 would reduce such turbulence by ensuring more laminar flow.

Figure 5C:
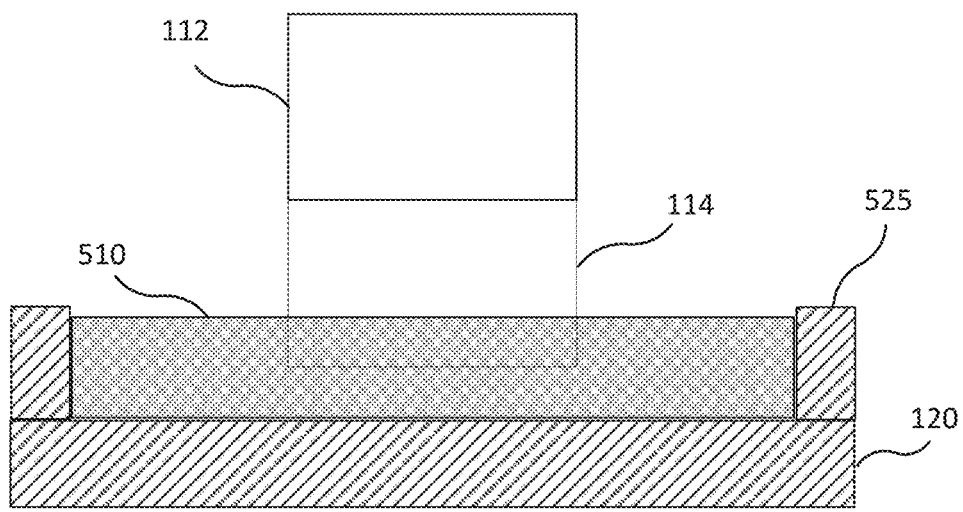
FIG. 5C illustrates an example embodiment of an objective with a proximal portion and a distal portion, where the distal portion includes the distal end that is immersed in the fluid.

FIG. 5C illustrates an example embodiment of an objective 110 with a proximal portion 112 and a distal portion 114, where the distal portion 114 includes the distal end 110-2 that is immersed in the fluid 510. In such embodiments, the entire distal portion (or alternatively, at least the part of the distal portion that is expected to be immersed in the fluid 510) may be untapered (e.g., cylindrical), so as to further facilitate laminar flow and decrease turbulence as the objective 110 moves.

Figure 5D:
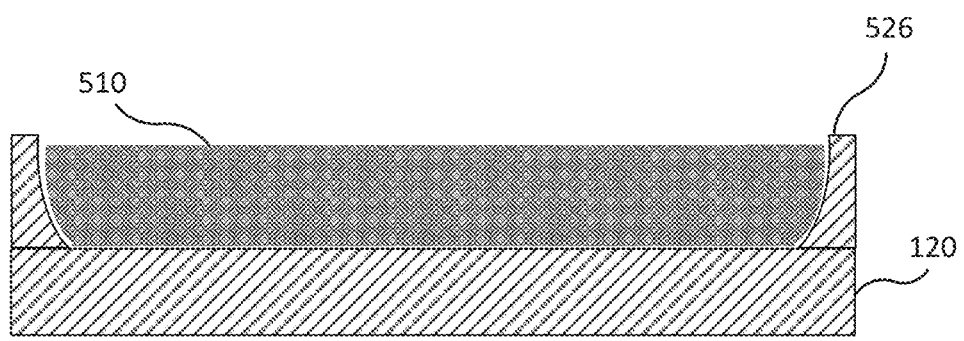
FIG. 5D illustrates an example embodiment with vertical walls that are curved.

FIG. 5D illustrates an example embodiment with vertical walls 526 that are curved. In some embodiments, an interior of the vertical walls is perpendicular to the exterior surface 120-1 of the substrate 120, such as the vertical walls 525 in FIGS. 5A-5C. In other embodiments, the interior of the vertical walls may not be perpendicular to the exterior surface 120-1 of the substrate 120, and may be disposed at an angle. In some embodiments, the interior of the vertical walls may be flat such as the vertical walls 525 in FIGS. 5A-5C. In other embodiments, the interior of the vertical walls may be curved, such as the vertical walls 526 in FIG. 5D. The interior of the vertical walls may be shaped according to any suitable profile.

In some embodiments, the height of the vertical walls 525 may be optimized to be sufficient to retain the fluid 510 within the region bounded by the vertical walls 525 and prevent the fluid 510 from splashing or otherwise escaping the region as the objective 110 moves within the region.

The embodiments where the objective 110 is immersed in fluid (e.g., the embodiments illustrated in FIGS. 5A-5D) may also have a feedback control loop similar to that illustrated in FIG. 4. In such cases, the droplet monitoring subsystem and the droplet delivery subsystem may be replaced by a fluid monitoring subsystem and a fluid delivery subsystem, respectively. In some embodiments, the fluid monitoring subsystem may continuously or periodically determine that the level of the fluid 510 in the region bounded by the vertical walls 525 is sufficient to immerse the objective 110. For example, the fluid monitoring subsystem may optically or electrically monitor the fluid level, monitor a weight of the fluid 510 (e.g., using a scale beneath the substrate that measures the weight of the substrate 120 and the fluid 510), or simply analyze the quality of the images captured via the objective 110 to ensure that the light rays are being refracted appropriately (thereby indicating that the objective 110 is still immersed in the fluid 510). As another example, the fluid monitoring subsystem may determine that an amount of fluid has evaporated or escaped the region by using an optical sensor to detect a presence of air bubbles in the fluid, where the air bubbles may be indicative of an evaporation of the fluid. The fluid monitoring subsystem may correlate an amount of air bubbles with an amount of evaporated fluid. In some embodiments, when the fluid monitoring subsystem has determined that a threshold amount of fluid has evaporated or otherwise escaped (e.g., based on detecting a threshold number of bubbles, based on electrically or optically detecting a drop in the fluid level line by a threshold amount), the fluid delivery system may be triggered to automatically replenish the lost fluid. For example, the fluid delivery system may include a conduit coupled to a fluid reservoir, and a suitable amount of replacement fluid may be transported to the region by any suitable means (e.g., EWOD, a pressure differential created by a pump).

Although FIGS. 5A-5D illustrate the above concepts with respect to the single substrate design of the simplified schematic of FIG. 1A (e.g., where nucleic acid sequences that are imaged may be disposed on or within the substrate 120), it is to be noted that the disclosure contemplates that the same concepts apply for the schematic of FIG. 1B, where there are two substrates. For example, referencing FIG. 1B, the nucleic acid sequences that are imaged according to FIGS. 5A-5D may be disposed within the space 150 (e.g., bound to the surface 120-2 or 140-1).

FIG. 6 illustrates an example method 600 for optically imaging a substrate for sequencing a nucleic acid sequence. The method may include, at step 610, disposing a droplet on an exterior surface of a substrate, wherein the substrate includes one or more nucleic acid sequences, and wherein the exterior surface of the substrate includes a first material. At step 620, the method may include positioning an objective at a first location over the exterior surface of the substrate such that a distal end of the objective is in contact with the droplet, wherein the distal end of the objective includes a second material, the second material being configured to provide a higher friction against the droplet than the first material. At step 630, the method may include moving the objective to a second location over the exterior surface of the substrate, wherein the moving of the objective is configured to move the droplet with the distal end of the objective such that the objective and the exterior surface of the substrate maintain contact with the droplet at the second location.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for optically imaging a substrate for sequencing a nucleic acid sequence on the substrate, including the particular steps of the method of FIG. 6, this disclosure contemplates any suitable method for optically imaging a substrate for sequencing a nucleic acid sequence on the substrate, including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
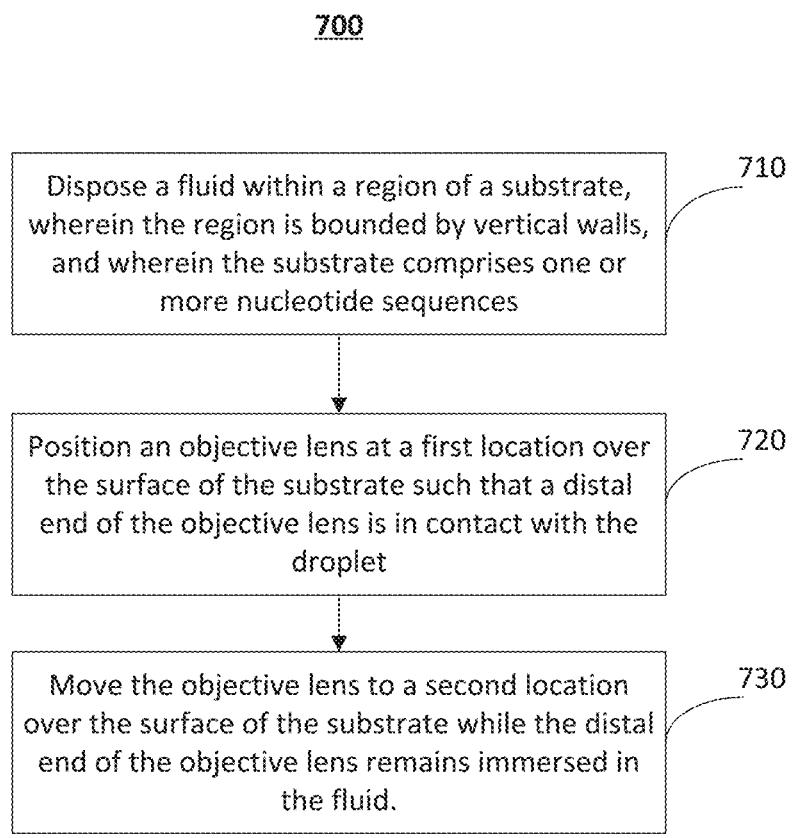
FIG. 7 illustrates another example method for optically imaging a substrate for sequencing a nucleic acid sequence on the substrate.

FIG. 7 illustrates another example method 700 for optically imaging a substrate for sequencing a nucleic acid sequence on the substrate. The method may include, at step 710, disposing a fluid within a region of a substrate, wherein the region is bounded by vertical walls, and wherein the substrate includes one or more nucleic acid sequences (e.g., at locations of the substrate within a boundary corresponding to the region). At step 720, the method may include positioning an objective at a first location over the exterior surface of the substrate such that a distal end of the objective is in contact with the droplet. At step 730, the method may include moving the objective to a second location over the exterior surface of the substrate while the distal end of the objective remains immersed in the fluid.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for optically imaging a substrate for sequencing a nucleic acid sequence on the substrate, including the particular steps of the method of FIG. 7, this disclosure contemplates any suitable method for optically imaging a substrate for sequencing a nucleic acid sequence on the substrate, including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. An optical imaging system for nucleic acid sequencing, the system comprising:
   an actuator;
   a substrate, wherein the substrate comprises vertical walls bounding a region of the substrate, the vertical walls being configured to retain a fluid within the region, and wherein the substrate comprises one or more nucleic acid sequences; and
   an objective comprising a proximal end and a distal end, wherein the proximal end of the objective is coupled to the actuator and the distal end of the objective is configured to be near an exterior surface of the substrate, wherein the distal end of the objective is configured to be immersed in the fluid;
   wherein the actuator is configured to move the objective from a first location over the exterior surface of the substrate to a second location over the exterior surface of the substrate while the distal end of the objective remains immersed in the fluid;
   further comprising a fluid monitoring subsystem for determining whether a portion of the fluid has evaporated from the region, wherein the fluid monitoring system comprises an optical sensor for detecting a presence of air bubbles in the fluid, and wherein determining whether a portion of the fluid has evaporated from the region comprises determining whether a threshold number of air bubbles are detected in the fluid.

2. The optical imaging system of claim 1, wherein the fluid comprises an oil.

3. The optical imaging system of claim 2, wherein the fluid comprises water.

4. The optical imaging system of claim 2, wherein the distal end of the objective is flat so as to reduce turbulence as the objective is moved from the first location to be second location.

5. The optical imaging system of claim 4, wherein the objective comprises a proximal portion and a distal portion, wherein the distal portion is untapered.

6. The optical imaging system of claim 2, wherein the actuator is configured to move the objective from the first location to the second location at a speed of 15 mm/sec.

7. The optical imaging system of claim 2, wherein an interior of the vertical walls are flat.

8. The optical imaging system of claim 2, wherein an interior of the vertical walls are curved.

9. The optical imaging system of claim 2, further comprising a fluid delivery subsystem for delivering fluid to the region.

10. The optical imaging system of claim 9, wherein the fluid delivery subsystem is configured to deliver additional fluid upon a positive determination by the fluid monitoring subsystem.

11. The optical imaging system of claim 10, wherein the fluid delivery subsystem comprises a conduit coupled to a fluid reservoir.

12. A method for optically imaging a substrate for sequencing a nucleic acid sequence, the method comprising:
   disposing a fluid within a region of a substrate, wherein the region is bounded by vertical walls, and wherein the substrate comprises one or more nucleic acid sequences;
   positioning an objective at a first location over the exterior surface of the substrate such that a distal end of the objective is in contact with the fluid; and
   moving the objective to a second location over the exterior surface of the substrate while the distal end of the objective remains immersed in the fluid; and
   determining that a portion of the fluid has evaporated from the region, wherein determining that the portion of the fluid has evaporated from the region comprises:
      detecting a presence of air bubbles in the fluid; and determining that a threshold number of air bubbles has been detected.

13. The method of claim 12, wherein the fluid comprises an oil.

14. The method of claim 12, wherein the fluid comprises water.

15. The method of claim 12, wherein the distal end of the objective is flat so as to reduce turbulence as the objective is moved from the first location to be second location.

16. The method of claim 15, wherein the objective comprises a proximal portion and a distal portion, wherein the distal portion is untapered.

17. The method of claim 12, wherein the objective is moved from the first location to the second location at a speed of 15 mm/sec.

18. The method of claim 12, wherein an interior of the vertical walls are flat.

19. The method of claim 12, wherein an interior of the vertical walls are curved.

20. The method of claim 12, further comprising:
    delivering additional fluid via a fluid delivery subsystem based on the determination.

21. The method of claim 20, wherein the fluid delivery subsystem comprises a conduit coupled to a fluid reservoir.

* * * * *